(12) United States Patent
Orlov et al.

(10) Patent No.: US 9,163,774 B2
(45) Date of Patent: Oct. 20, 2015

(54) SUPPORT STRUCTURE WITH FEATURES FOR PRECISION LEVELING

(76) Inventors: Evgeny M. Orlov, Syracuse, NY (US); Alexei K. Shkurko, Liverpool, NY (US)

(*) Notice: Subject to any disclaimer, the term of this patent is extended or adjusted under 35 U.S.C. 154(b) by 1339 days.

(21) Appl. No.: 12/701,220

(22) Filed: Feb. 5, 2010

(65) Prior Publication Data
US 2010/0224745 A1  Sep. 9, 2010

Related U.S. Application Data

(60) Provisional application No. 61/151,048, filed on Feb. 9, 2009.

(51) Int. Cl.
| | |
|---|---|
| F16M 11/24 | (2006.01) |
| F16M 7/00 | (2006.01) |
| F16M 11/04 | (2006.01) |
| F16M 11/14 | (2006.01) |
| F16M 11/18 | (2006.01) |
| F16M 11/20 | (2006.01) |
| F16M 11/34 | (2006.01) |

(52) U.S. Cl.
CPC .............. *F16M 7/00* (2013.01); *F16M 11/046* (2013.01); *F16M 11/14* (2013.01); *F16M 11/18* (2013.01); *F16M 11/2078* (2013.01); *F16M 11/24* (2013.01); *F16M 11/34* (2013.01)

(58) Field of Classification Search
CPC ....... F16M 7/00; F16M 11/046; F16M 11/14; F16M 11/34; F16M 11/2078; F16M 11/24; F16M 11/18

USPC ................ 52/126.1, 126.3, 126.6; 248/188.2, 248/188.3, 188.4, 188.5, 188.8
See application file for complete search history.

(56) References Cited

U.S. PATENT DOCUMENTS

| | | | | |
|---|---|---|---|---|
| 287,102 | A * | 10/1883 | Cullingworth | 248/644 |
| 970,425 | A * | 9/1910 | Curran | 182/205 |
| 2,282,285 | A * | 5/1942 | Olson | 248/169 |
| 2,341,542 | A * | 2/1944 | Grime | 254/93 H |
| 2,540,578 | A * | 2/1951 | Hall et al. | 92/19 |
| 2,668,682 | A * | 2/1954 | Dalton | 248/169 |
| 3,030,889 | A * | 4/1962 | Parker | 417/429 |
| 3,208,698 | A * | 9/1965 | Samhammer et al. | 248/650 |
| 5,148,892 | A * | 9/1992 | Lu | 182/201 |
| 5,634,619 | A * | 6/1997 | Alessi | 248/219.3 |
| 5,918,997 | A * | 7/1999 | Hsieh | 403/104 |
| 6,286,441 | B1 * | 9/2001 | Burdi et al. | 108/147 |
| 6,748,873 | B2 * | 6/2004 | Brown, Sr. | 108/6 |
| 7,617,018 | B2 * | 11/2009 | Ford et al. | 700/279 |

* cited by examiner

*Primary Examiner* — Kimberly Wood
(74) *Attorney, Agent, or Firm* — Paul Frank + Collins PC

(57) ABSTRACT

A support structure is provided that can comprise a central support member and leveling devices arranged in a deployed configuration where the leveling devices are radially offset from the central support member. In one embodiment of the support structure, each of the leveling devices can comprise an actuator assembly for fine positioning of a support plane of the support structure. The actuator assembly can communicate with a control system, and in one example the control system is operatively configured to monitor the position of the support plane, providing feedback in the form of a control that operates the actuator to adjust the orientation of the support plane.

18 Claims, 17 Drawing Sheets

DETAIL B

DETAIL C

D-D

DETAIL E

DETAIL F

SUPPORT STRUCTURE WITH FEATURES FOR PRECISION LEVELING

CROSS-REFERENCE TO RELATED APPLICATIONS

This application claims the benefit of priority under 35 U.S.C. §119(e) from U.S. Provisional Patent Application Ser. No. 61/151,048, entitled "Lightweight Motorized Portable Tripod for Heavy-Duty Applications Requiring Precision Horizon Leveling" and filed on Feb. 9, 2009. The content of this application is incorporated herein by reference in its entirety.

TECHNICAL FIELD

The present invention relates to support structures such as tripods, and more particularly to embodiments of a support structure that comprise manual and automated features for transport, installation, and leveling of the support structure.

BACKGROUND

Many tripods and related structures are designed to provide a level, stable platform on which to support a load. These devices typically comprise a raised platform and several elongated legs that are affixed to the platform. The body of each leg extends away from the platform to a surface, e.g., the ground.

This configuration permits adjustments to the planarity of the platform. These adjustments may be provided as part of the construction of the legs, such as by combining mechanisms and components that can alter the length of each leg independently of the other legs of the structure. Such alterations can accommodate for differences in the ground, such differences being of the type that can negatively impact the planarity of the platform.

It may be advantageous, therefore, to provide a support structure with a robust construction to not only accommodate greater loads, but also to offer dynamic planarity adjustment characteristics. These characteristics can improve accuracy and stability. Moreover, it may be advantageous to combine these features into a support structure that is easily portable, compact in size, and that simplifies installation and planarity adjustment.

SUMMARY

There is described below in several embodiments a support structure that is configured for transport and deployment with limited operator interface. Examples of the support structure are provided in which positioning and leveling of a platform is accomplished with separate positioning mechanisms. These mechanisms can comprise a gross positioning mechanism that, in conjunction with other features, reduces the need for an operator to hold onto the structure during the initial set-up of the structure. A fine positioning mechanism, incorporated into some embodiments as an automated feature, can be engaged after gross positioning. This mechanism adjusts and tunes the position of the platform to provide a substantially level surface on which to mount, e.g., radar equipment.

These concepts and features are provided in one or more embodiments, which include in one embodiment, a support structure that comprises a central support member defining a central support axis, a pivot end, and a support end opposite the pivot end, the support end defining a plane orthogonal to the central support axis. The support structure can also comprise a first joint coupled to the central support member, the first joint having a position on the central support axis, the position describing a distance from the pivot end. The support structure can further comprise a leveling device coupled to the first joint, the leveling device comprising an actuator for generating motion along a leveling device axis, the motion causing movement of the plane. The support structure can be further described where the leveling device is operative in a first configuration and a second configuration, wherein each of the first configuration and the second configuration describe a radially offset relation of the leveling device relative to the central support axis, and wherein the first configuration changes to the second configuration in response to the position of the first joint.

In another embodiment, an automated multi-axis support structure can comprise a central support member defining a central support axis, the central support member comprising a support end with a support plate orthogonal to the central support axis. The support structure can also comprise a central collar aligned with the central support axis, the central collar comprising an outer retaining ring and a configuration locking mechanism for changing the inner diameter of the outer retaining ring. The support structure can further comprise a movable stay member coupled to the outer retaining ring, a leveling collar coupled to the movable stay member, the leveling collar comprising a clamp with an aperture defining a leveling mount axis, and an actuator assembly aligned with the leveling mount axis, the actuator assembly comprising an outer housing exteriorly surrounded by the clamp. In this embodiment, the support structure can also comprise a control system coupled to the actuator assembly, the control system comprising a dynamic leveling indicator proximate the support plate and a controller providing a control to the actuator, the control for controlling the motion of the actuator.

In yet another embodiment, a system for leveling a load can comprise a central support system comprising a central support member with a central support axis and a support plane orthogonal to the central support axis, the support plane for receiving the load. The system can also comprise a leveling mount system for adjusting the position of the support plane, the leveling mount system comprising a leveling device with a leveling mount axis and an actuator aligned with the leveling mount axis, the actuator for providing movement of the support plane, the movement comprising a fine positioning movement. The system can further comprise a support stay system comprising a plurality of elongated members coupling the leveling device and the central support member, and a control system providing a control to the actuator, the control system comprising a dynamic leveling indicator providing information about the orientation of the support plane. The system can further be described where the control operates the fine positioning movement to adjust the orientation of the support plane in response to the information, and where the leveling device is operative in a first configuration and a second configuration, wherein each of the first configuration and the second configuration describe a radially offset relation of the leveling device relative to the central support axis, and wherein the first configuration changes to the second configuration in response to the position of the elongated members relative to the central support axis.

BRIEF DESCRIPTION OF THE DRAWINGS

So that the manner in which the above recited features of the present invention can be understood in detail, a more particular description of the invention briefly summarized above, may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference can be made to the following detailed description, read in connection with the drawings in which.

DETAILED DESCRIPTION

In accordance with its major concepts, and broadly stated, the present invention is directed to a support structure with features that make the support structure lightweight and easily portable, but that also improve (and simplify) leveling and/or orienting of a load plane disposed on the support structure. There is provided, for example, embodiments of the support structure with a central load bearing member defining the load plane, and leveling assemblies that are coupled to the central load bearing member. When the support structure is deployed on a surface, the leveling assemblies can be located in a radially offset relation to the central load bearing member to stabilize the central load bearing member in a substantially upright orientation. Moreover, each of the leveling assemblies can be configured with positioning characteristics that permit gross positioning to accommodate variations in the deployment surface and to secure the central load member in the upright orientation, as well as fine positioning separately enabled by each leveling assembly to accurately move the load plane to the desired orientation. The accurate positioning of the load plane can be facilitated in embodiments of the support structure by a control system for automated actuation of the leveling assemblies. This feature is particularly beneficial because the inventors have found that the automation can further reduce the level of interaction required by an operator to deploy the support structure to receive the load.

Details of the concepts and aspects of the present invention, briefly outlined above, were disclosed in the embodiment described in Provisional Patent Application No. 61/151,048. Portions of this application (hereinafter, "the provisional text") are reproduced immediately below and in FIGS. 1-7 of the present disclosure:

[Begin Text from Provisional Patent Application]

Figure 1:
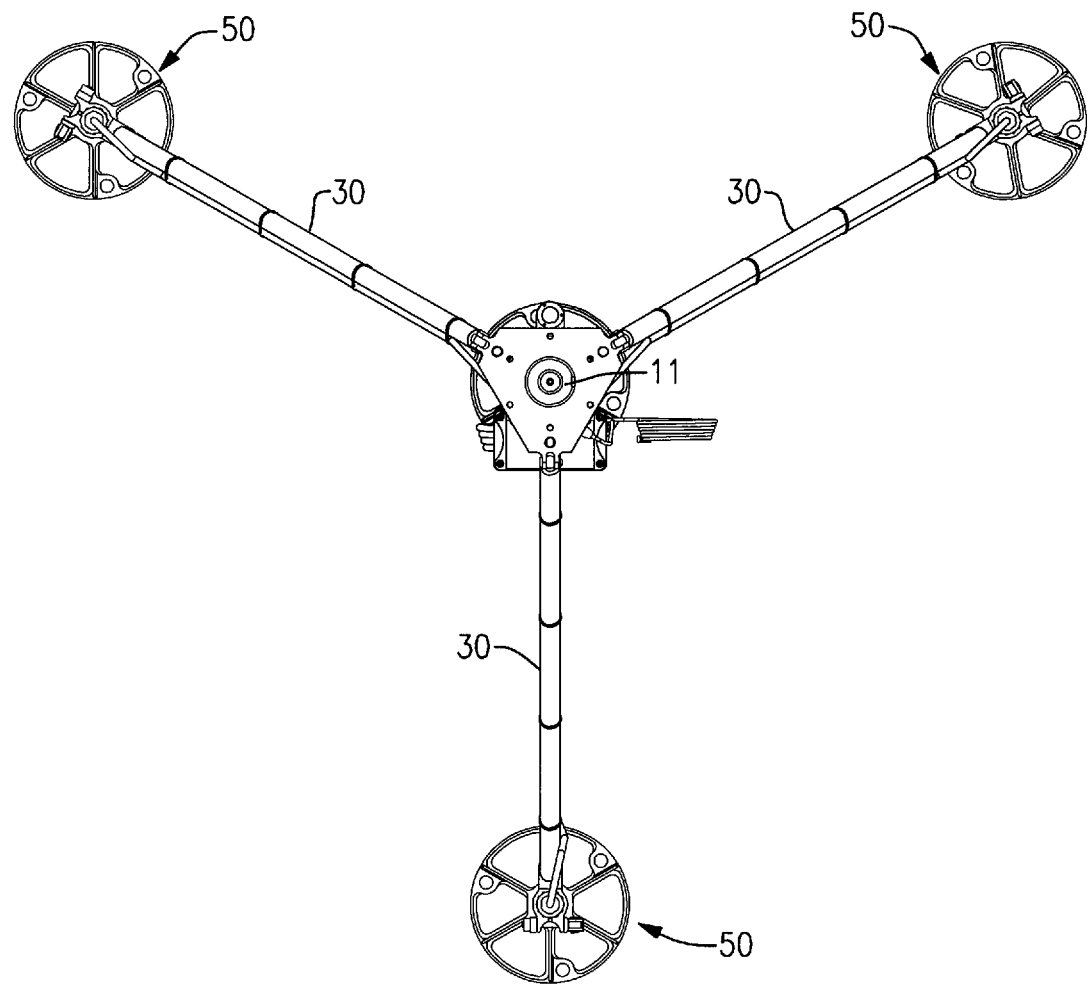
FIG. 1 is a representation of FIG. 1 of Provisional Patent Application No. 61/151,048, which is a top view of an exemplary embodiment of a support structure.
Figure 2:
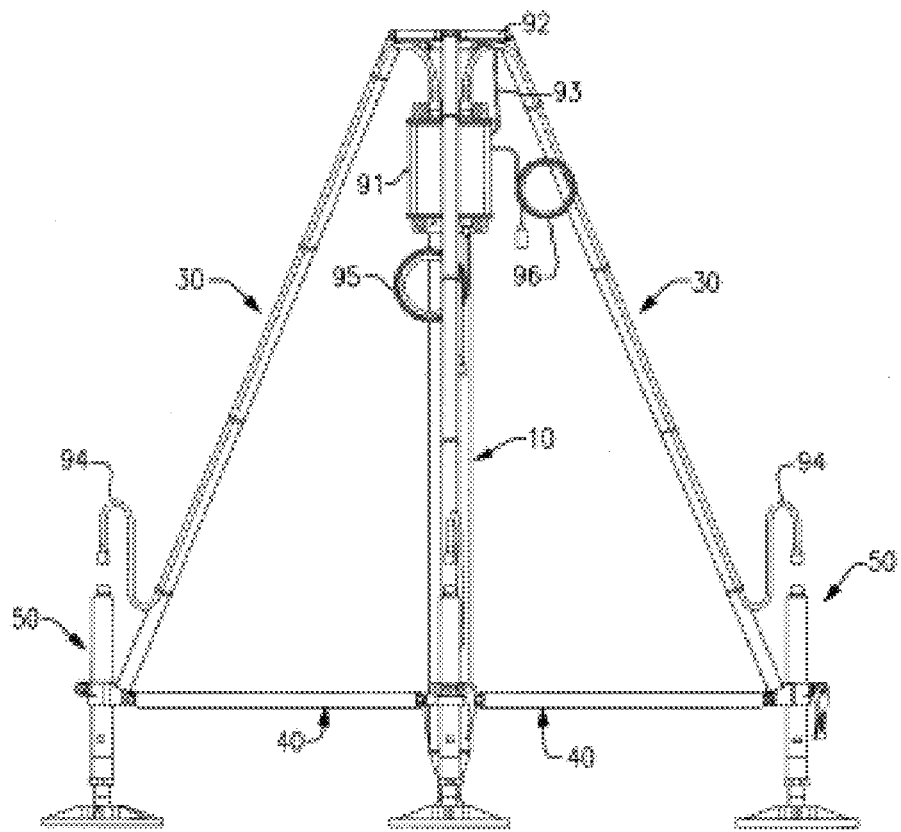
FIG. 2 is a representation of FIG. 2 of Provisional Patent Application No. 61/151,048, which is a side view of an exemplary embodiment of the support structure of FIG. 1.
Figure 3:
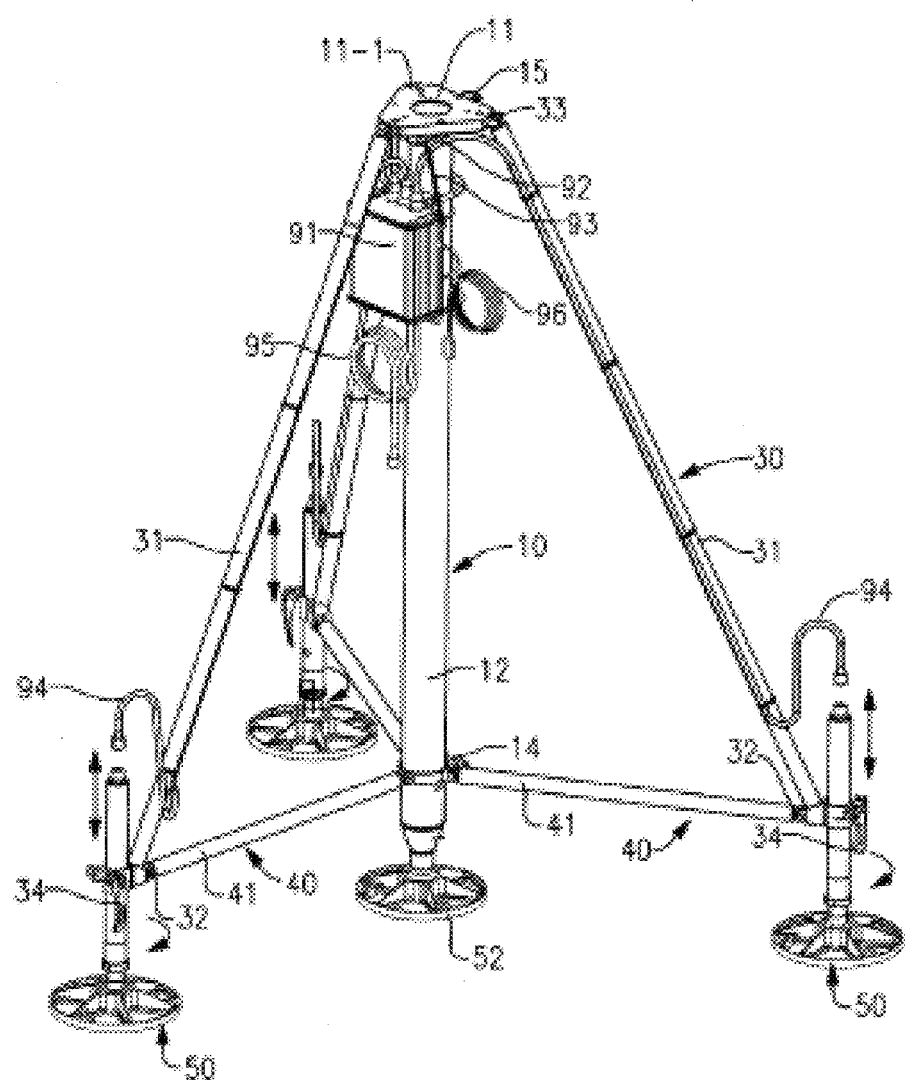
FIG. 3 is a representation of FIG. 3 of Provisional Patent Application No. 61/151,048, which is a perspective view of an exemplary embodiment of the support structure of FIGS. 1 and 2.

FIGS. 1, 2, and 3 show a tripod having a center mounting payload platform 11 permanently attached to the top of a central support column assembly 10 comprising a central structural tubular member 12 and a leveling pad 52 with a spherical joint permanently attached to the bottom of the central structural member 11, providing automatic adjustment to compensate for uneven ground. Three clevis joints 11-1 are integral part of the platform, providing pivot attachment for three tubular support stays 30. The platform is equipped with means to attach payload, and at least one leveling indicator 15 of the following type: a bull's-eye level, a tubular level, or an electronics tilt sensor.

Each of three support stay assemblies 30 comprising a tubular rod 31, rod end 33, and a clamp unit 32 are pivotally attached to the mounting platform at one end and to a positioning stay assembly 40 at the other end. Each of three positioning stay assemblies 40 comprising a tubular rod 41, two threaded bushings 43, and two rod ends 42 are pivotally attached at the remaining ends to a collar 14, which can freely slide over structural member 12 while unlocked, providing folding/unfolding action for the tripod. When a tripod unfolded position is achieved, a clamp lever 34A locks the collar 14 and each of the support stays 30 along with positioning stays 40 in the tripod working configuration.

Figure 4:
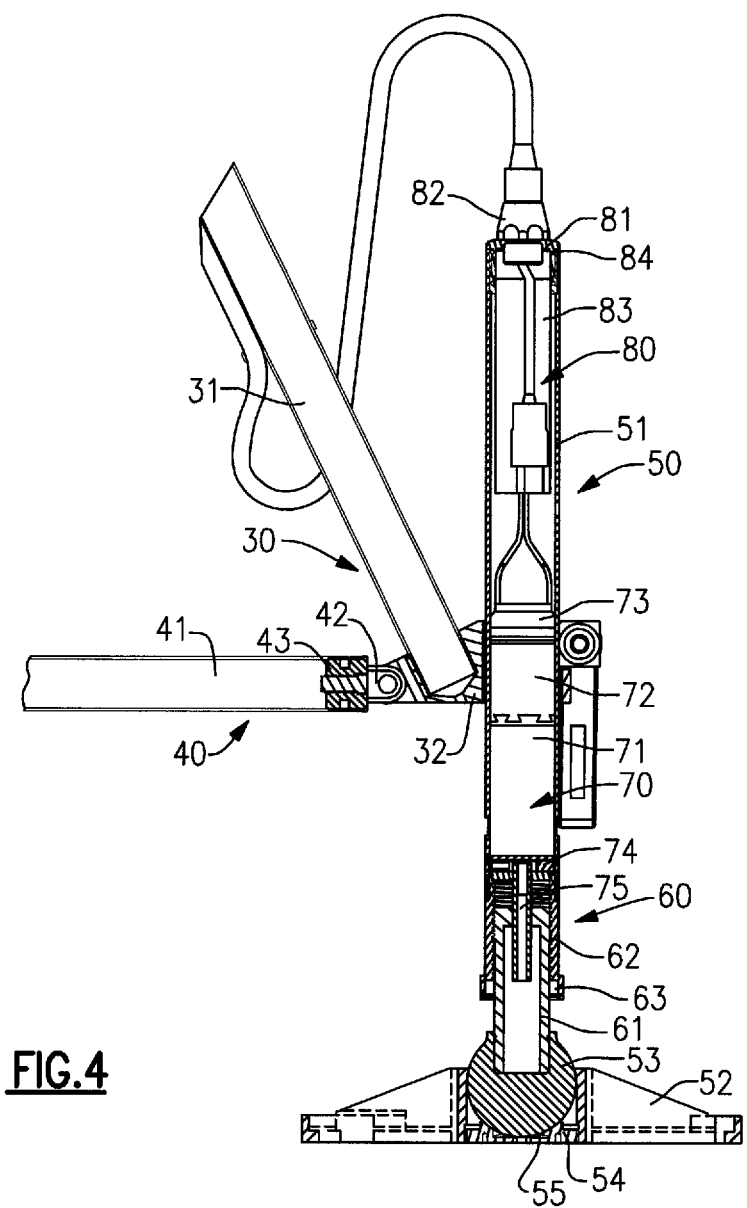
FIG. 4 is a representation of FIG. 4 of Provisional Patent Application No. 61/151,048, which is a side, cross-section view of a portion of an exemplary embodiment of the support structure of FIGS. 1-3.
Figure 5:
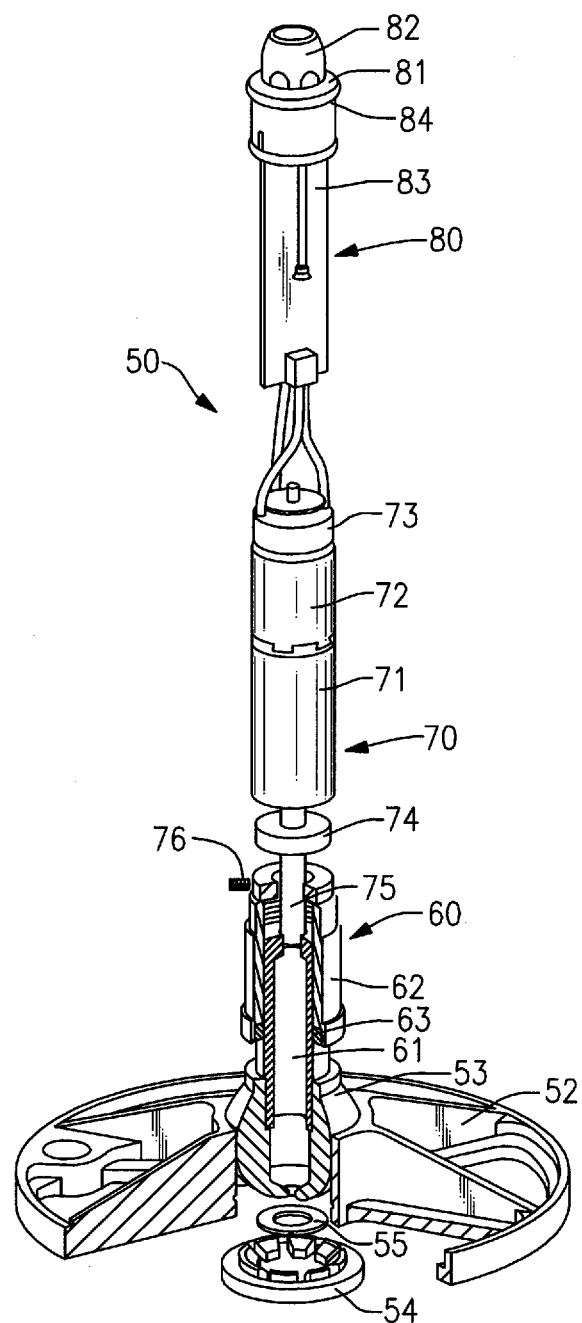
FIG. 5 is a representation of FIG. 5 of Provisional Patent Application No. 61/151,048, which is a perspective, cross-section view of a portion of an exemplary embodiment of the support structure of FIGS. 1-4.

Three motorized leveling mount assemblies 50 comprising a leveling pad 52, a spherical joint 53, a spherical cap 54, a disk spring 55, a lead screw assembly 60, a geared motor assembly with a positioning encoder 70, a motor controller assembly 80, all housed inside of a tubular shell 51 are slidably inserted into each clamp locking unit as shown in FIGS. 4 and 5. Each leveling pad 52, mounted on spherical joint 53, automatically adjusts to uneven ground. Multiple radial slots on a spherical contact surface of the spherical cap 54 provide improved performance in an environment with high level of dust. The lead screw assembly 60, comprising a lead screw 61, a guiding body 62, and a retaining ring 63, is permanently attached to the spherical joint 53. The geared motor assembly 70, comprising a gear head 71, a motor 72, a positioning encoder 73, a motor flange 74, and a shaft extension 75, fixed to the lead screw assembly with a set screw 76. The shaft extension 75 slides freely inside a rectangular slot at the top flange of the guiding body 62 along its axial direction, while translating a rotary movement from the motor to the lead screw.

The motor controller assembly 80, comprising a connector flange 81, an external cable connector 82, a controller PCB 83, and two O-rings 84, is inserted into the tubular shell 51 and electrically connected to the motor 72 and the encoder 73. A multi-axis inclinometer 92 is mounted collinearly with a leveling reference surface of the payload platform 11. A central electronics distribution box 91 with a governing motherboard PCB, connectors for external cables, control buttons, and status lights is mounted to the central support column 11. A set of electrical cables, comprising an inclinometer cable 93 and three motor cables 94, interconnect electrically the inclinometer 92, the central distribution box 91, and leveling mounts 50. An external power supply cable 95 and a communication cable 96 provide electrical power and data exchange with the outside world.

The tripod leveling comprise from two steps—1-initial leveling and 2-precision leveling.

Figure 6:
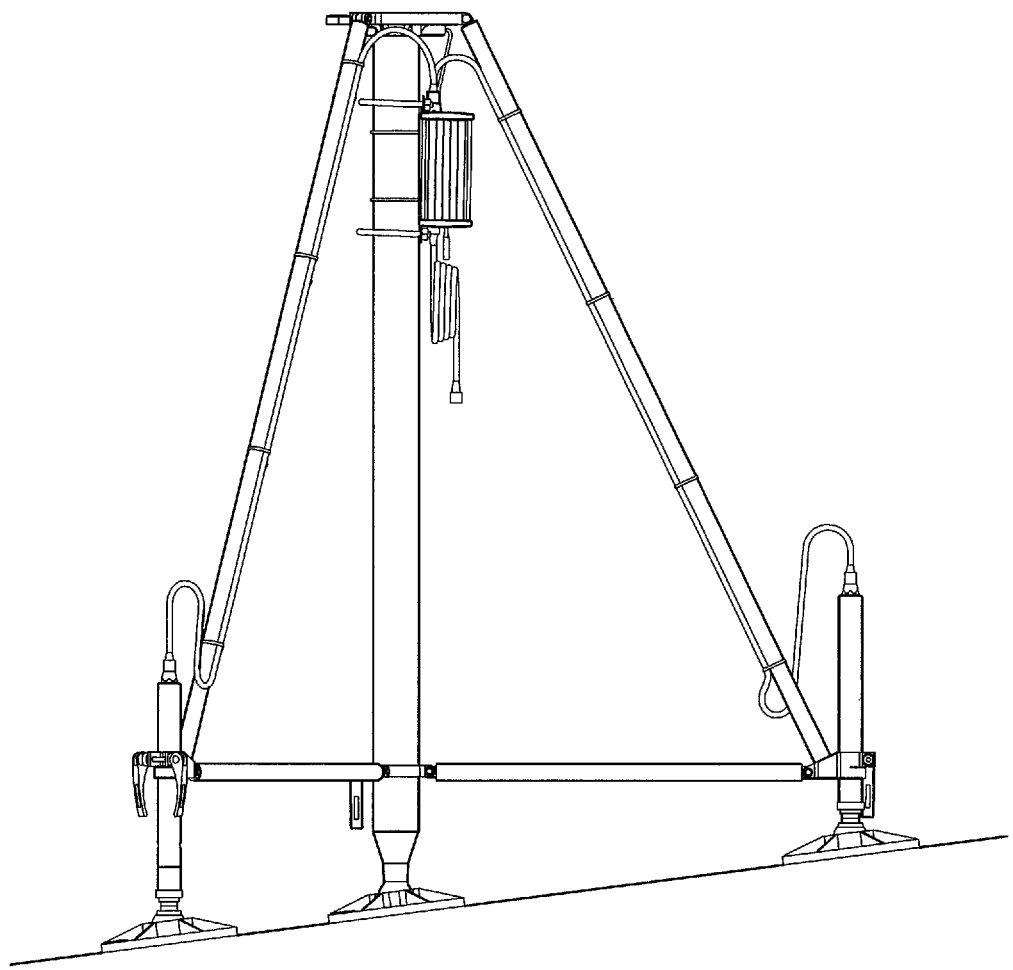
FIG. 6 is a representation of FIG. 6 of Provisional Patent Application No. 61/151,048, which is a side view of an exemplary embodiment of a support structure.

Initial leveling—when clamp levers 34 are loosened, the inclination of the mounting platform 11 can be manually controlled in either direction attained by free and simultaneous axial sliding of leveling mounts 50 inside clamp units 32. Spring 55 provides pre-tension in the spherical joint, thus stabilizing the column 10 vertical orientation during tripod initial leveling. When desired accuracy of the tripod initial leveling is achieved, locking clamp levers 34 restricts movement of leveling mounts, fixes the tripod inclination and thus completes the initial stage of the tripod leveling as shown in FIG. 6.

Precision leveling—the device further self-controls its inclination autonomously by means of electrically interconnected electro-mechanical components in the following order: the inclinometer 92 sends the payload platform 11 inclination angle data to the governing electronics in the central distribution box 91, which calculates values to lengthen or shorten leveling mounts 50 needed to achieve the platform required leveling; the values are farther passed to the leveling mount motor controllers 83, directed servomotors 72 prescribed rotary motion, which translates in the length adjustment of leveling mounts, thus achieving the platform precision horizon leveling. The device can self-monitor its leveling status periodically and adjust it accordingly.

The leveling status of the tripod can be monitored remotely via the communication cable 96.

[End Text from Provisional Patent Application]

The provisional text describes an embodiment of "a tripod." In this embodiment, there is illustrated and described particular components, configurations, and devices that can be used to implement one or more of the concepts of the present invention. There is shown in the FIGS. 1-7, and discussed in the provisional text, that the tripod can comprise a "central support column assembly 10," a plurality of "leveling mount assemblies 50," "support stay assemblies 30," and "positioning stay assemblies 40." These components are combined to form the tripod of the provisional text, or more broadly to the structural aspects of a support structure that is made in accordance with concepts of the present invention. Moreover, considering individually these and other features of the support structure set forth and discussed in the provisional text, there can be identified several other concepts that are explained in more detail in connection with the provisional text and the embodiments that appear below.

Figure 8:
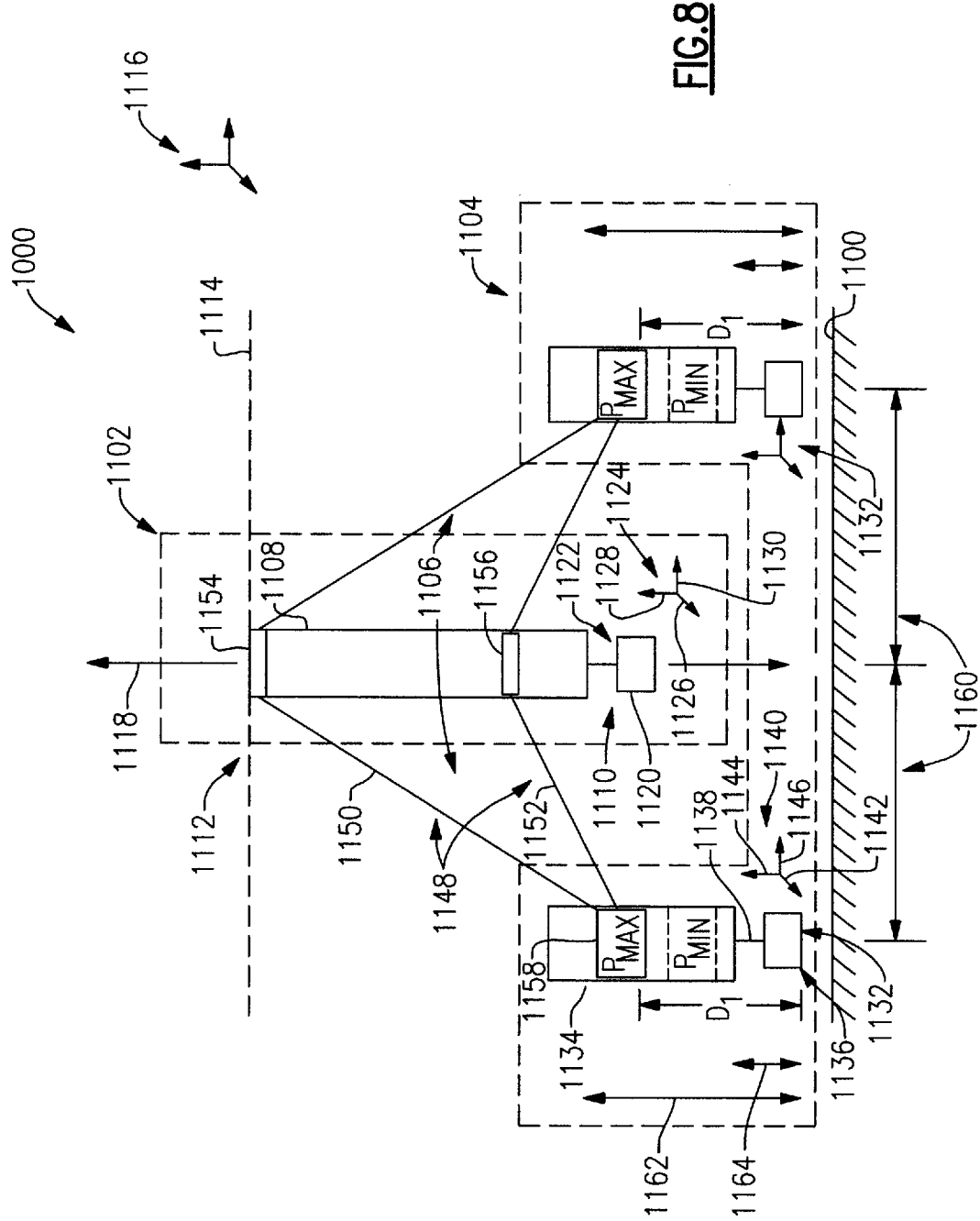
FIG. 8 is a schematic diagram of another exemplary embodiment of a support structure.
Figure 9:
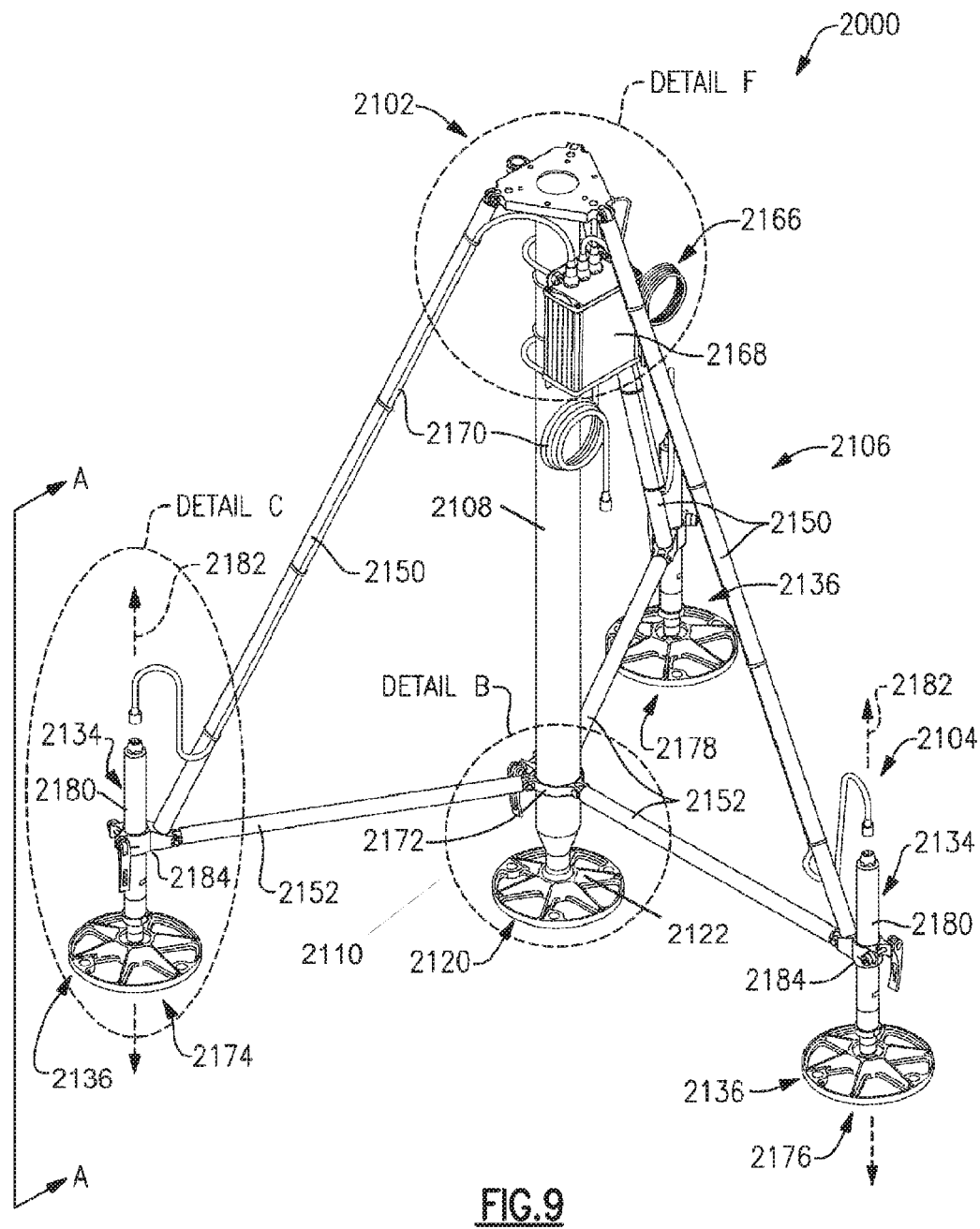
FIG. 9 is a perspective view of yet another exemplary embodiment of a support structure.
Figure 10:
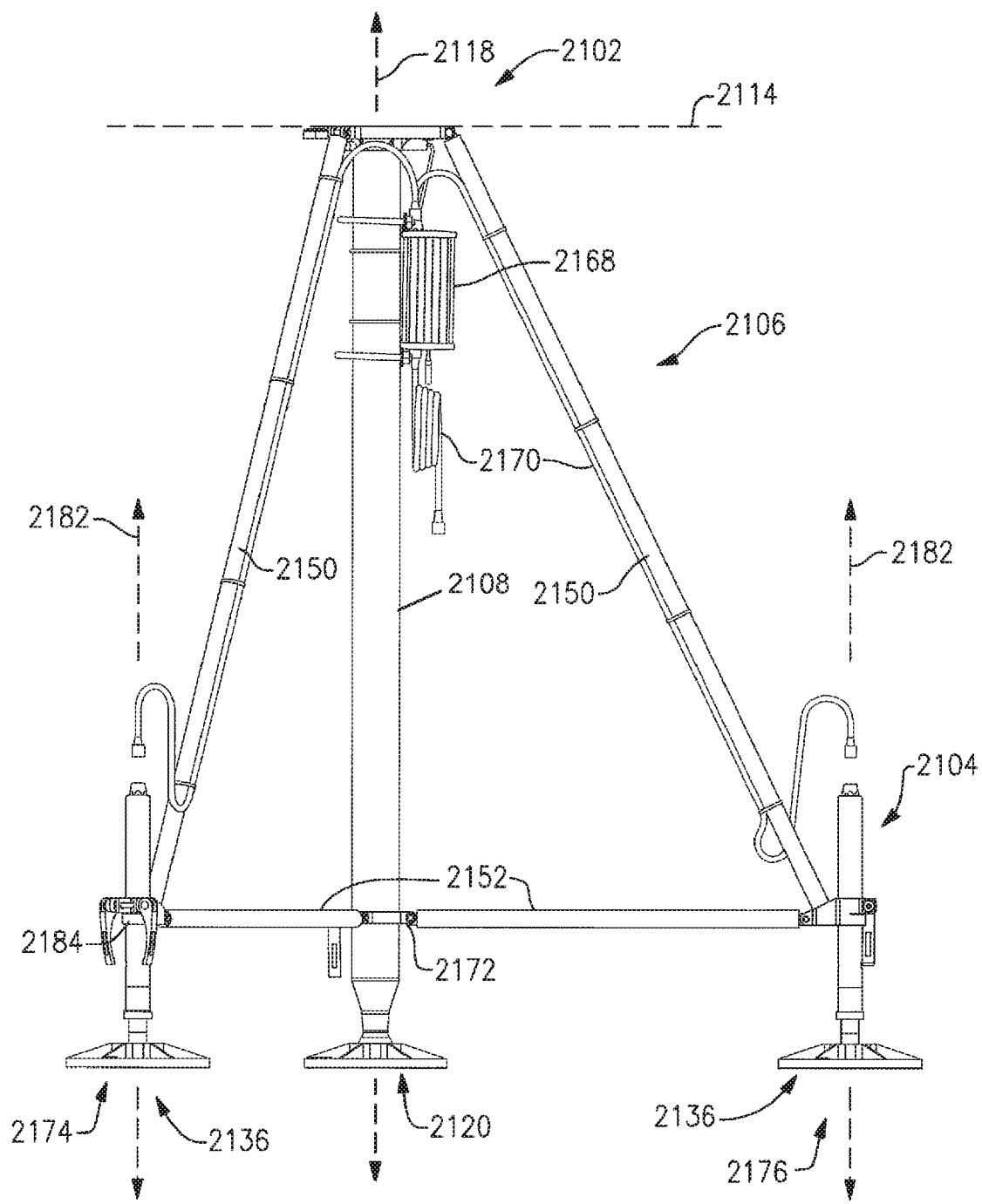
FIG. 10 is a side view of the support structure of FIG. 9.

For continued explanation and details of these concepts and features, reference can now be had to the FIGS. 8-15, and particularly to FIG. 8 in which there is illustrated a schematic diagram of one exemplary embodiment of a support structure 1000 for deployment on a deployment surface 1100. There is shown that the support structure 1000 can comprise a central support assembly 1102 (e.g., central support column assembly 10 of FIGS. 2 and 3), a leveling mount assembly 1104, and a support stay assembly 1106 (tubular support stays 30 of FIGS. 1, 2, 3, and 4). The central support assembly 1102 can comprise a central support member 1108 (e.g., central structural tubular member 12 of FIG. 3) with a pivot end 1110, a support end 1112 that defines a support plane 1114 movable about a support plane axes 1116, and a central support axis 1118. On the pivot end 1110 there can be located a central support pad 1120 and a central support joint 1122, which couples the central support member 1108 and the central support pad 1120. This combination also permits articulation of the central support pad 1120 (e.g., leveling pad 52 of FIGS. 4 and 5) such as about central articulating axes 1124, which in the present example permits articulation about a central pitch axis 1126, a central roll axis 1128, and a central yaw axis 1130.

The leveling mount assembly 1104 can comprise a plurality of leveling devices 1132 that have an actuating assembly 1134 (e.g., motorized leveling mount assemblies 50 of FIGS. 1, 2, 3, 4, and 5), a leveling support pad 1136, and a leveling support pad joint 1138, which couples the actuating assembly 1134 and the leveling support pad 1136. The leveling support pad joint 1138 can permit articulation of the leveling support pad 1136 about, for example, leveling support articulating axes 1140. In one construction, the leveling support pad 1136 can articulate about a pad pitch axis 1142, a pad roll axis 1144, and a pad yaw axis 1146. Each of these axes, and the leveling support articulating axes 1140 generally, allow the leveling support pad 1136 to be maneuvered to accommodate for variations in the deployment surface 1100.

The support stay assembly 1106 can comprise stay members 1148 (e.g., rod 31 and tubular rod 41 of FIGS. 3 and 4) that are used to secure the actuating assembly 1134 to the central support member 1108. The stay members 1148 can comprise a fixed stay member 1150 and a movable stay member 1152. The fixed stay member 1150 can be secured proximate the support end 1112 with an end joint 1154 so that the fixed stay member 1150 can be angularly displaced relative to the central support axis 1118. The movable stay member 1152 can be secured to the central support member 1108 with a central member joint 1156, which permits of the movable stay member 1152 to translate along and be angularly displaced relative to the central support axis 1118. Each of the stay members 1148 can be coupled to the leveling devices 1132 with a leveling device joint 1158 that permits relative movement between the stay members 1148 and the leveling support pad 1136.

Figure 7:
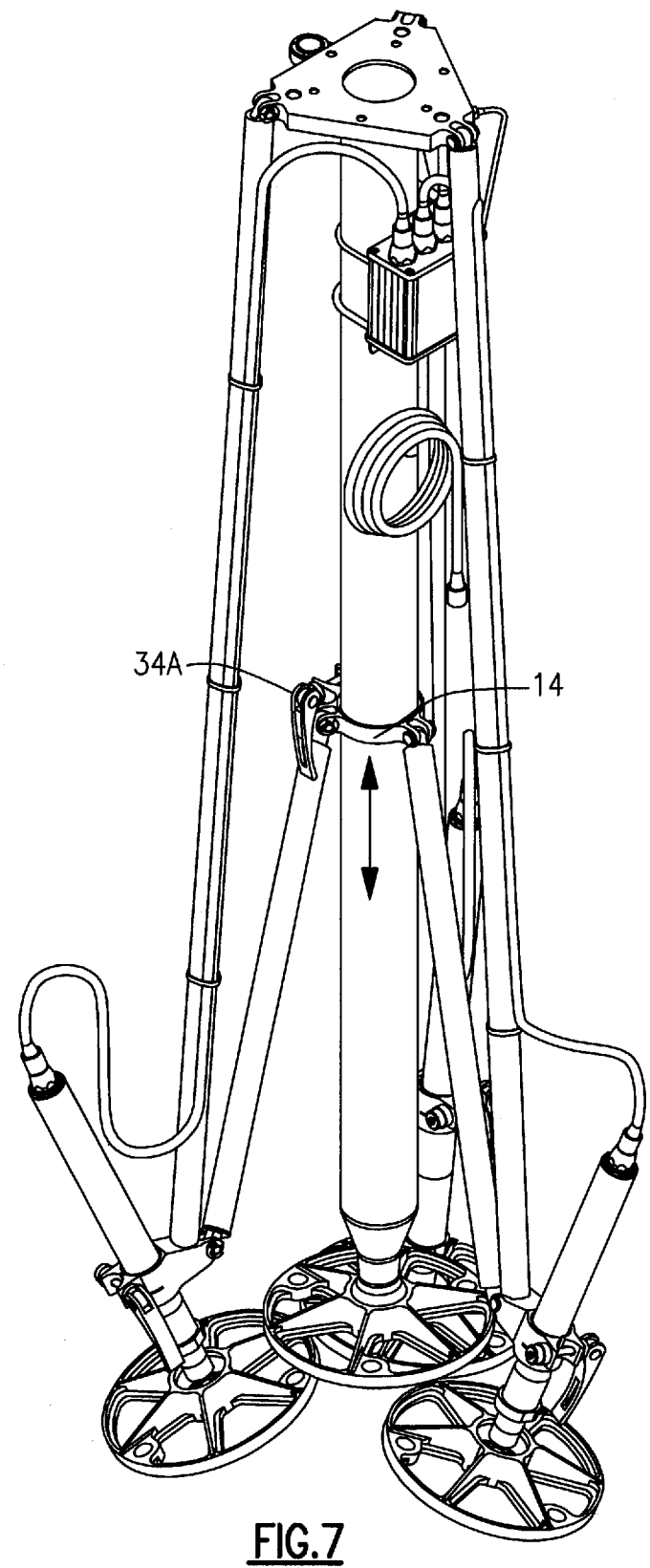
FIG. 7 is a representation of FIG. 7 of Provisional Patent Application No. 61/151,048, which is a perspective view of an exemplary embodiment of a support structure.

The relative movement of the stay members 1148 allows the support structure 1000 to be configured in a plurality of working configurations. These working configurations can be generally defined by the position of the leveling devices 1132, and in one particular embodiment this position is measured by a radial offset position 1160 of the leveling devices 1132 with respect to the central support axis 1118. In its deployed configuration, such as the configuration illustrated in FIG. 8, the radially offset position 1160 can have its maximum value so that the leveling mount assembly 1104 can support and stabilize the central support member 1108. Facilitated by the translation of the movable stay member 1152, the support structure 1000 can also have a transport configuration in which the radially offset position 1160 is reduced, and in one example of the transport configuration the radially offset position 1160 has its minimum value. One example of the transport configuration is illustrated in FIG. 7 from the provisional text above.

The support structure 1000 in the transport configuration generally fits within a smaller volumetric space, or form factor, as compared to the same support structure 1000 in the deployed configuration. Generally this form factor permits the support structure 1000 to be carried in an appropriately sized container of dimensions consistent with the size, shape, and characteristics of the support structure 1000 and its components. These containers can comprise duffel bags, cartons, tool cases, and the like. In one embodiment of the support structure 1000, the form factor can define a volume from about 0.2 m$^3$ to about 1 m$^3$.

The central support member 1108 and the stay members 1148 can be constructed monolithically or as an assembly of integrated members such as elongated members of cross-section and dimensions suitable to support a given load. These elongated members can include solid rods and shafts, tubes with hollow cross-sections, and combinations thereof. Each of the elongated members can comprise various materials including, but not limited to, metals (e.g., aluminum, steel, and stainless steel), high-strength plastics, composites, as well as other materials with physical properties (e.g., tensile and compressive strength) suited for supporting the given load. In one example, it may be desirable to select materials that are compatible with certain manufacturing techniques such as machining, milling, turning, and extruding, each of which may be utilized to form all or a part of the member(s) of the central support member 1108, the stay members 1148, and other components of the support structure 1000.

In one embodiment of the support structure 1000, the central support member 1108 can be removed in lieu of components that comprise the support end 1112. This construction of the support structure 1000 can accommodate such configurations in which the leveling devices 1132 are coupled to one another absent the central support member 1108, or in another embodiment the leveling devices 1132 can actuate freely about points of restraint co-located proximate the support end 1112. Some examples of the points of restraint are discussed below. In one embodiment, the support structure 1000 can operate as a tripod, in which at least three leveling devices 1132 are coupled to the support end 1112. In another embodiment, the support structure 1000 can be configured so that the load is support by the leveling devices 1132 such as is the case when there is no central pivot (e.g., pivot end 1110) or other contact made between the deployment surface and the central support member 1108.

As illustrated in the example of FIG. 8, the leveling devices 1132 can provide various positioning movements such as a gross positioning movement 1162 and a fine positioning movement 1164. The gross positioning movement 1162 can be used to accommodate for deviations in the deployment surface 1100 by providing variable positioning of the leveling support pad 1136 such as between a maximum position $P_{max}$ and a minimum position $P_{min}$. Each of the positions of the leveling support pad 1136 can be defined by a distance D1, which in one example can be measured from the leveling support pad 1136 to the leveling device joint 1158. The difference between maximum position $P_{max}$ and the minimum position $P_{min}$ can vary in accordance with, e.g., the design, implementation, and characteristics of the support structure 1000. Embodiments of the support structure 1000 can be provided with at least about 12 mm between the maximum position $P_{max}$ and the minimum position $P_{min}$. In one example, the difference can be from about 50 mm to about 100 mm.

The fine positioning movement 1164 can cause movement of the support plane 1114 about the support plane axes 1116. This movement can be implemented independently of the gross positioning movement 1162 such as by securing the leveling device joint 1158 to the actuating assembly 1134. The actuating assembly 1134 can comprise mechanisms such as threaded mechanisms, geared mechanisms, pneumatic mechanisms, and the like. These mechanisms can be manually operated with a knob or dial that can be rotated or otherwise manipulated to change the orientation of the support plane 1114. In other embodiments, the devices that are utilized can be automated such as by incorporating actuators (e.g., motors, pneumatic cylinders, etc.). These actuators can be coupled to, or integrated as part of, the mechanisms in a manner that facilitates, e.g., the positioning and orienting of the support plane 1114.

Movement of the devices for use as the actuating assembly 1134 may provide at least about 25 mm of translation for the fine positioning movement 1164, and in one construction of the support structure 1000 the devices can provide translation from about 12.5 mm and about 75 mm. Moreover, and in other embodiments of the support structure 1000, the translation of the actuating assembly 1134 for the fine positioning movement 1162 can facilitate angular movement of the support plane 1114 such as rotation about the central articulating axes 1124. In one example, the rotation can be at least about 2° such as by providing angular movement of at least about ±0.1° about each axis of the central articulating axes 1124. In another example, the rotation can be from about 3° to about 10°, wherein the rotation about each axis can be from about ±0.1.5° to about ±0.5°.

Referring now to FIGS. 9-15, there is shown another exemplary embodiment of a support structure 2000, oriented in its deployed configuration and made in accordance with concepts of the present invention. Noted is the fact that like numerals are used to identify like components as between the support structure 1000 of FIG. 8 and the support structure 2000 of FIGS. 9-15, but the numerals are increased by 1000 (e.g., 1000 is now 2000 in FIGS. 9-15). For example, and like the support structure 1000 of FIG. 8 above, the support structure 2000 can comprise a central support assembly 2102, a leveling mount assembly 2104, and a support stay assembly 2106. The support structure 2000 can also comprise a control system 2166 with a controller 2168 (e.g., electronics distribution box 91 of FIGS. 2 and 3) and connective cables 2170, which in the present example permit control, control signals, and instructions to be exchanged between the leveling devices 2132 and the controller 2168.

In one embodiment, at the pivot end 2110, the central support assembly 2102 can comprise a central collar 2172 coupled to the movable stay member 2152, wherein the central collar 2172 can be moved between several positions along the central support axis 2118. The leveling mount assembly 2104 can comprise a first leveling device 2174, a second leveling device 2176, and a third leveling device 2178 ("the leveling devices"). Each of the leveling devices can comprise an outer housing 2180 (e.g., tubular shell 51 of FIG. 4) defining a leveling device axis 2182, which can form part of the actuating assembly 2134, and a leveling collar 2184 coupled to the outer housing 2180 to permit gross positioning of the leveling support pad 2136. This gross positioning is useful for deployment of the support structure 2000 on surfaces such as the deployment surface (e.g., deployment surface 1100) with bumps, inclines, rocks, steps, and any variety of deviations and inconsistencies that affect the flatness of the surface and/or orientation of part of the support structure 2000

The central support pad 2120 and the leveling support pad 2136 (collectively, "the support pads") can be sized, shaped, and configured to stabilize the support structure 2000 in its unfolded configuration on the deployment surface e.g., deployment surface 1100). The support pads can comprise any one of the materials, and generally well-known manufacturing techniques (e.g., machining and turning) discussed in connection with embodiments of the support structures disclosed herein. Though each is illustrated as being generally circular, the support pads can likewise be configured with other shapes that can include squares, triangles, diamonds, ovals, and ellipses, among many others Implements such as spikes, barbs, and flotation devices could also be used either as the support pad or incorporated as a feature of the support pads. The features of the support pads can be selected based on factors particular to the implementation of the support structure 2000. These factors can include, but are not limited to, factors related to the deployment surface (e.g., deployment surface 1100) (e.g., composition, angle of inclination, flatness, and/or planarity or non-planarity), load factors (e.g., size, shape, and/or weight), and environmental factors (e.g., wind velocity).

The central support joint 2122 and the leveling support joint 2138 can secure the support pads to one or more of the central support member 2108 and the actuating assembly 2134. The joints can permit articulation of the support pads such as by permitting the support pad to conform to deviations in the deployment surface (e.g., deployment surface 1100). Examples of suitable joints can comprise ball-and-socket joints, pin-and-clevis joints, multi-axis joints, and any combinations thereof. One type of joint for use as the central support joint 2122 and the leveling support joint 2138 is discussed in connection with FIG. 12 below.

The leveling collar 2184 can be disposed in surrounding relation to the outer housing 2180 of the actuating assembly 2134. This configuration can permit movement of the leveling collar 2184, which can allow for the gross positioning. This movement can be facilitated in one embodiment as sliding movement along the leveling device axis 2182. The inventors have found that the variable position of the leveling collar 2184 largely reduces difficulties in deploying the support structure 2000 on surfaces (e.g., the deployment surface 1100) with deviations and inconsistencies, examples of which were discussed above. For example, during deployment of the support structure 2000, each of the support pads can be located in different positions on the leveling device axis 2182 to accommodate for different levels, heights, and relate deviations in the deployment surface (e.g., deployment surface 1100).

The central collar 2172 can be disposed in communication with the central support member 2108 so that the central collar 2172 can move along the central support axis 2118. Each of the leveling devices 2132 can likewise be coupled to the central collar 2172 such as through the movable stay member 2152. This connection can change the radial offset relation between the leveling mounts 2118 and the central support axis 2118 in response to movement of the central collar 2172 relative to the pivot end 2110 of the central support member 2108. As discussed above, the change in the radial offset relation can change the working configuration of the support structure 2000, such as the deployed configuration in which the radial offset is greater than the radial offset in the transport configuration.

Each of the central collar 2172 and the leveling collar 2184 (collectively, "the collars") can be constructed to securely attach, respectively, to the central support member 2108 and the outer housing 2180. This attachment can prevent movement of the collars, with one construction of the collars being configured to permit the operator to affix the position of the collars during deployment of the support structure 2000. Affixing the central collar 2172 can affix the support structure 2000 in one of the working configurations contemplated herein. Securing the leveling collar 2184 to, e.g., the outer housing 2180, can secure the support pad at one of the positions such as the maximum position $P_{max}$ and the minimum position $P_{min}$ above.

Exemplary construction of the collars can form friction or compression fits, such as by providing clamping, squeezing, or similar compressive forces on or about the peripheral portion of the corresponding portion of the support structure 2000. It may be desirable, for example, that embodiments of the support structure 2000 incorporate collars with mechanisms, and particularly hand-operated mechanisms, to release these forces, and permit movement of the collars along the respective axis (e.g., the central support axis 2118 and the leveling device axis 2182). The inventors have found such mechanisms to be particularly useful to facilitate set-up of the support structure because the operator can open the support structure to its deployed configuration, grossly adjust the relative position of the support pads, lock or secure the collars in place, and then commence the fine adjustments of the support plane.

Figure 11:
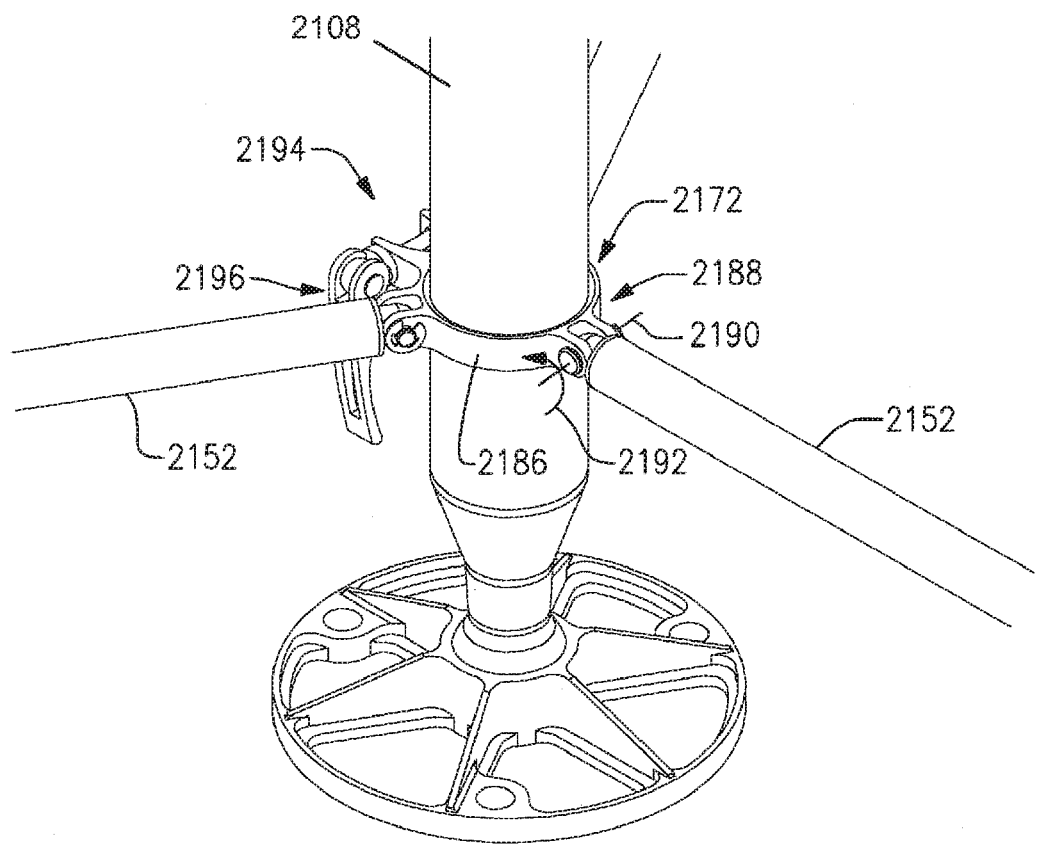
FIG. 11 is a perspective, detail view of a leveling mount for use in a support structure, such as the support structure of FIGS. 8-10.
Figure 12:
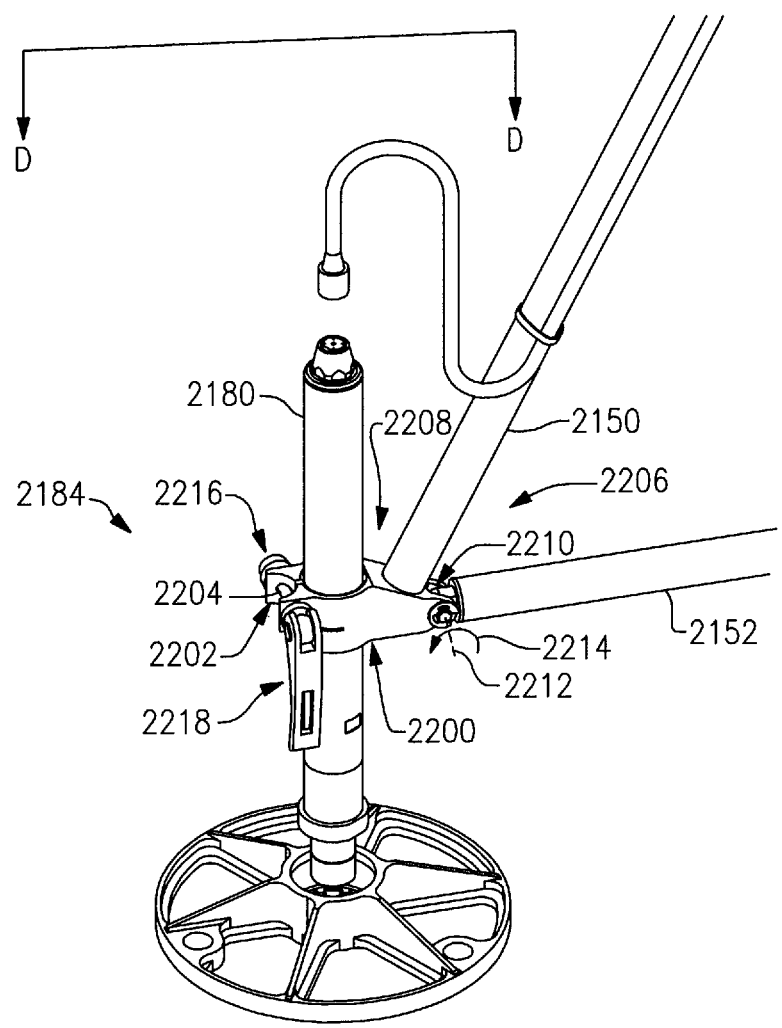
FIG. 12 is a perspective, detail view of a central collar for use in a support structure, such as the support structure of FIGS. 8-10.

Referring specifically to FIGS. 11 and 12, there is illustrated in detail examples of the central collar 2172 (FIG. 11) and leveling collar 2184 (FIG. 12). In FIG. 11, it is seen that the central collar 2172 can comprise an outer retaining ring 2186 (e.g., collar 14 of FIGS. 3 and 7) in surrounding relation to the central support member 2108. The central collar 2172 can also comprise a central collar coupling joint 2188 with a central collar joint axis 2190, the configuration of which permits rotation 2192 of the corresponding movable stay member 2152 secured thereto. The central collar 2172 further comprises a central collar locking mechanism 2194 with a configuration locking actuator 2196. More particular to the present example the configuration locking actuator 2196 can be actuated by the operator to secure the central collar 2172 to the central support member 2108, and to release the central collar 2172 so that the central collar 2172 can freely move along the central support axis 2118.

There is shown in FIG. 12 that the leveling collar 2184 can comprise a leveling collar body 2200 with an actuator end 2202 that has a clamp 2204 for receiving the outer housing 2180 therein. The leveling collar body 2200 can also comprise a mounting end 2206 for receiving and securing the fixed stay member 2150 and the movable stay member 2152. The mounting end 2206 can comprise an aperture 2208, which is sized and shape to receive the fixed stay member 2150. The mounting end 2206 can also comprise a leveling collar coupling joint 2210 (e.g., clamp unit 32 of FIGS. 3 and 4) with a leveling collar joint axis 2212 for permitting rotation 2214 of the movable stay member 2152. The leveling collar 2184 can further comprise a leveling collar locking mechanism 2216 with a leveling locking actuator 2218 (e.g., clamp lever 34, 34A of FIG. 3). The leveling locking actuator 2218 can be actuated by the operator to secure the leveling collar 2184 to the outer housing 2180, and to release the leveling collar 2184 to freely move along the leveling device axis 2182.

Coupling of the movable stay member 2152 with the central collar coupling joint 2188 and the leveling collar coupling joint 2210 can be accomplished in a variety of ways. Pins, bushings, bearings, fasteners, and machined features are all suitable components with which to attach these members, while also maintaining the rotation 2192, 2214 described above. Likewise the central collar locking mechanism 2194 and the leveling collar locking mechanism 2216 ("the locking mechanisms") can incorporate one or more common features that permit the locking mechanisms to secure the position of the corresponding collar. In one example, the central collar 2172 and the leveling collar 2184 can comprise opposing movable portions that form an opening for, e.g., receiving one of the central support member 2108 and the outer housing 2180. The locking mechanism can be attached to the movable portions. Actuation of the locking mechanism can force the movable portions together, decreasing the size of the opening, and in one particular embodiment the decreased size causes the central collar 2172 and the leveling collar 2184 to exert a force against, respectively, the central support member 2108 and the outer housing 2180.

In one embodiment of the support structure 2000, the locking mechanisms can be coupled to a central actuation device that permits the operator to actuate the locking mechanisms from a single actuation point. This point can be located at or near the support plane 2114, variously on the central support member 2108, or in other locations convenient to the operator's reach. Examples of the central actuation device can comprise one or more cables, coupled to each locking mechanism, and a trigger mechanism coupled to the cables. In one example, the trigger mechanism can be used to cause the central collars 2172 and the leveling collar 2184 to exert the force discussed above.

Figure 13:
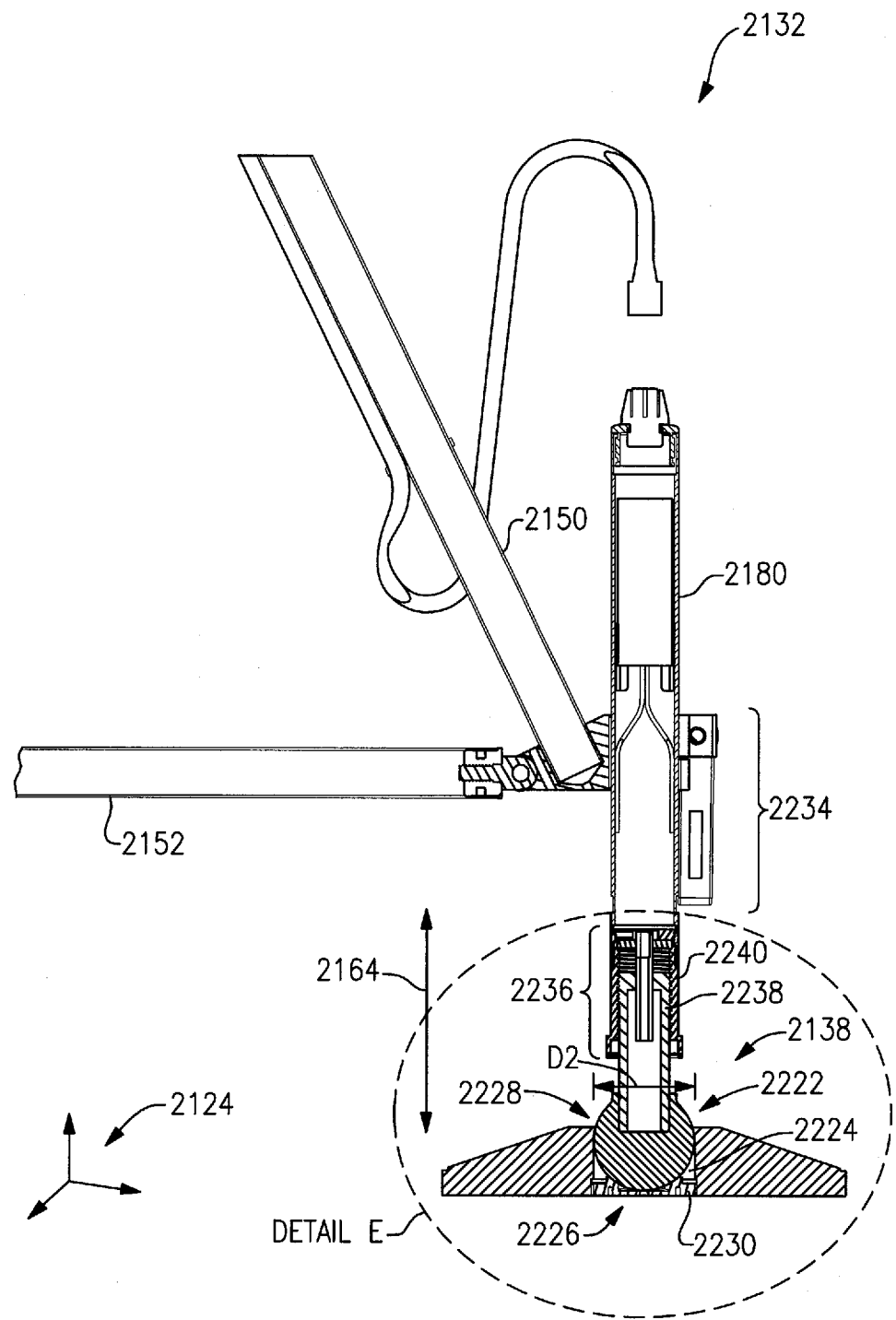
FIG. 13 is a side, detail, cross-section view of a leveling mount for use in a support structure, such as the support structure of FIGS. 8-10.
Figure 14:
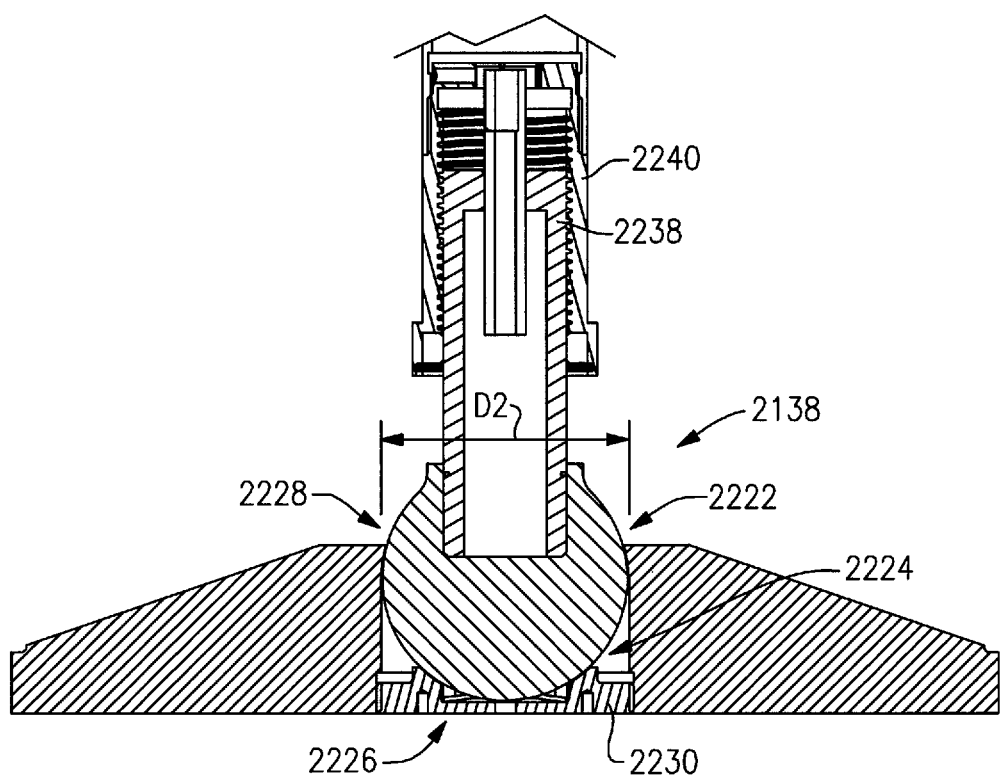
FIG. 14 is a side, detail, cross-section view of the leveling mount of FIG. 13.

FIGS. 13 and 14 provide a cross-section of the leveling device 2132 in which is illustrated one example of the joints for use in moveably securing one or more of the support pads (e.g., the central support pad 2120 and the leveling support pad 2136) to the central support member 2108 and/or the actuating assembly 2134. The leveling support joint 2138 can permit relative movement between the support pad and the respective member, with one construction of the central support joint 2122 and the leveling support joint 2138 permitting only relative rotation about the axes of the central articulating axes 2124 and the leveling support articulating axes 2140.

In one embodiment of the support structure 2000, the joints can comprise a ball joint 2220 that has a ball member 2222 (e.g., spherical joint 53 of FIGS. 4 and 5), and in which the support pad comprises a socket 2224 for receiving the ball member 2222 therein. The socket 2224 can comprise a lower opening 2226 and an upper opening 2228 with diameter D2 that is sized and dimensioned to interfere with the outer diameter of the ball member 2222. The leveling support joint 2138 can also comprise an end cap 2230 proximate the lower opening 2226 and configured to be secured to the support pads.

There is also shown in the FIGS. 13 and 14 that the leveling device 2132 can comprise an actuator 2232 such as a motor assembly 2234 with portions located in and/or surrounded by the outer housing 2180. The leveling device 2132 can also comprise a lead screw assembly 2236 coupled to the motor assembly 2234. The lead screw assembly 2236 (e.g., lead screw assembly 60 of FIGS. 4 and 5) can comprise an inner threaded portion 2238 (e.g., lead screw 61 of FIGS. 4 and 5) and an outer threaded portion 2240 (e.g., guiding body 62 of FIGS. 4 and 5) having interlocking threads engaged in a manner that generates, in this example, movement such as the fine positioning movement 2164 discussed in detail above. These threads can be of any pitch suited to articulate the support plane 2114 about the support plane axes 2116 as discussed herein.

In one embodiment, actuation of the motor assembly 2234 such as by control from the controller 2168 causes active engagement of the threads on the inner threaded portion 2238 and the outer thread 2240. This engagement can translate the outer housing 2180 such as by moving the outer housing 2180 relative to the leveling support pad 2136. Such translation can occur over all or a portion of the threaded engagement. Exemplary constructions of the lead screw assembly 2236 can comprise threaded engagement suited for providing at least about 25 mm of travel, with one particular embodiment of the support structure 2000 having threaded engagement of from about 12 mm to about 100 mm.

Embodiments of the support structure 2000 can likewise be configured so that, for example, the motor assembly 2234 is coupled to lead screw assembly 2236 to reduce stress, strain, and mechanical forces on the actuator 2232. These components may fit together in a manner that reduces and effectively eliminates lateral loading on the motor shaft. This effect can be instantiated using shafts, key ways, slots, pins, set screws, and any other type of mechanical fastening technique in which the loading on the shaft is minimized.

Figure 15:
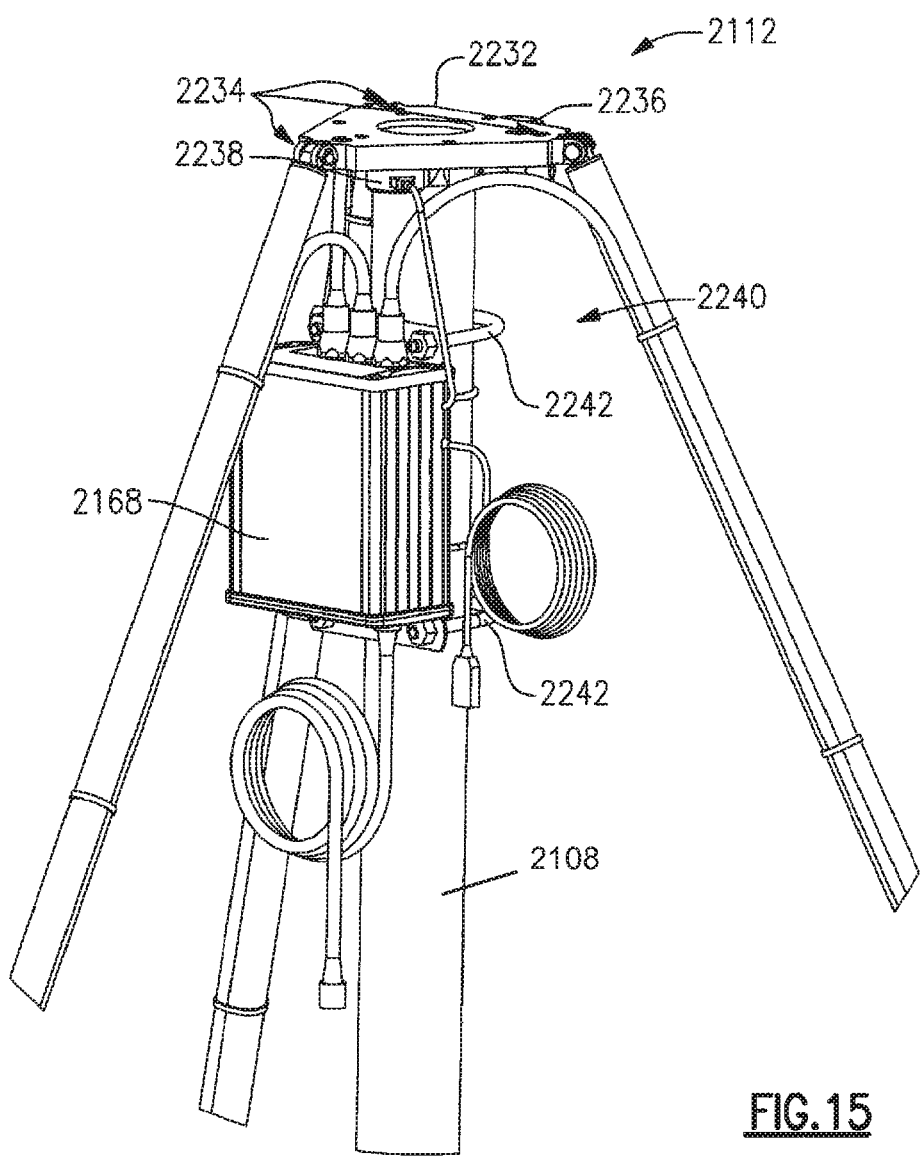
FIG. 15 is a is a top, perspective, detail view of a support end of a support structure, such as the support structure of FIGS. 8-10.

Referring now to FIG. 15, there is provided an example of the support end 2112 of the support structure 2000. The support end 2112 can comprise a support plate 2244 (e.g., center mounting payload platform 11 of FIGS. 1 and 3) on which is disposed one or more support plate joints 2246 (e.g., clevis joints 11-1 of FIG. 3), a manual leveling indicator 2248 (e.g., leveling indicator 15 of FIG. 3) such as the bull's-eye level, the tubular level, and an electronics tilt sensor discussed in the provisional text above, and a dynamic leveling indicator 2250 (e.g., inclinometer 92 of FIGS. 2 and 3). There is also shown that the support structure 2000 can comprise a controller mount assembly 2252 such as a pair of u-bolt clamps 2242 used to secure the controller 2168 to the central support member 2108.[1]

The controller 2168, and the control system 2166 generally, can communicate with the actuating assembly 2134 such as by sending a control and/or or instructions to the automated devices therein. Controllers and devices of the type for use as the controller 2168 can comprise or more groups of electrical circuits that are each configured to operate, separately or in conjunction with other electrical circuits, to operate the actuating assembly 2134. The electrical circuits that are used to implement the concepts of the present invention are constructed in a manner that interconnect a variety of electrical elements such as, but not limited to, resistors, capacitors, transistors, transmission lines, and switches. These electrical circuits may further communicate with other circuits (and/or devices), which execute high-level logic functions, algorithms, as well as process firmware, and software instructions. Exemplary circuits of this type include, but are not limited to, field programmable gate arrays ("FPGAs"), application specific integrated circuits ("ASICs"), as well as other circuits and circuit devices implemented as semiconductor devices and on printed circuit boards ("PCBs"). While all of these elements, circuits, and devices function individually in a manner that is generally understood by those artisans that have ordinary skill in the electromechanical arts, it is their combination and integration into functional electrical groups and circuits that generally provide for the concepts of the present invention that are disclosed and described herein.

The dynamic leveling indicator 2250 can be any device for measuring the position of the support plane 2114. Devices such as the multi-axis inclinometer 92 discussed in the provisional text are suited for use as the dynamic leveling indicator 2250 because these devices can provide information as to the relative position of the support plane 2114, and more particularly the orientation of the support plane 2114 relative to the horizon. Moreover, these devices can work in conjunction with the controller 2168 to form a feedback loop, in which the controller 2168 continues to query the dynamic leveling indicator 2250 for orientation information, formulates any adjustments that need to be made to the position of the support plane 2114, and delivers the proper control information to one or more of the leveling devices 2132.

Figure 16:
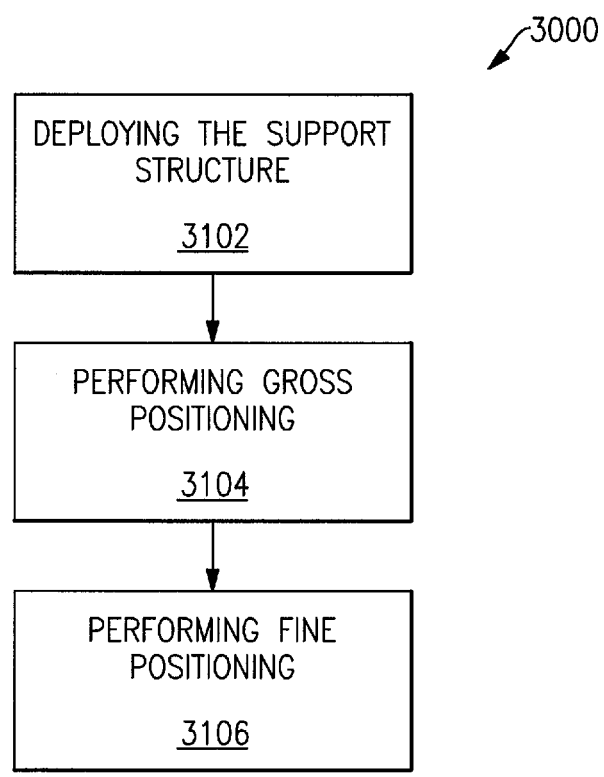
FIG. 16 is an example of a method for implementing an exemplary embodiment of a support structure, such as the support structures of FIGS. 1-10.
Figure 17:
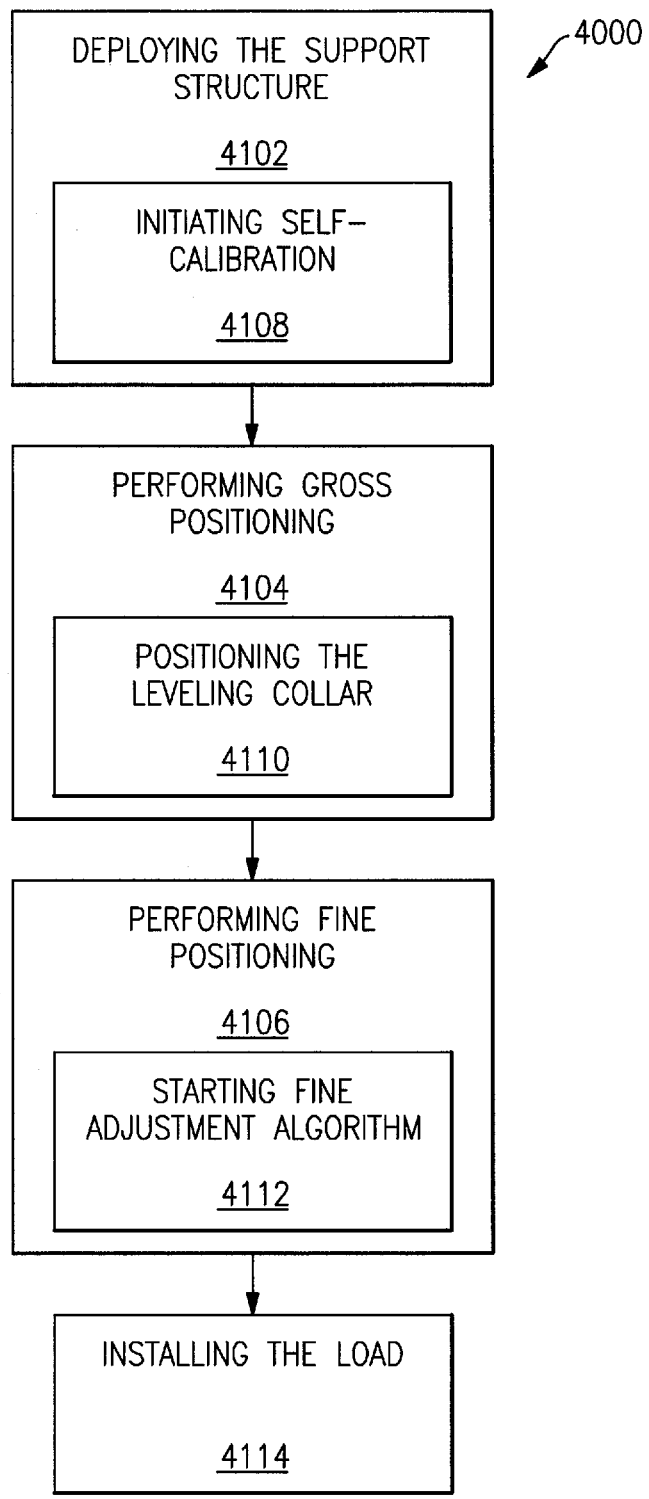
FIG. 17 is an example of another method for implementing an exemplary embodiment of a support structure, such as the support structure of FIGS. 1-10.

Discussing the operation and implementation of support structures such as the support structure 1000 and 2000 and the tripod of the provisional text, reference can be had to the flow diagrams of FIGS. 16 and 17. These flow diagrams provide details of exemplary embodiments of methods for leveling the support plane of the support structure. Referring first to FIG. 16, there is shown that a method 3000 can comprise, at step 3102, placing the support structure in its deployed configuration, at step 3104, performing a gross positioning movement of the support structure, and at step 3106, performing a fine positioning movement of the support plane.

For purposes of the present discussion, and by way of non-limiting example, the operation of the support structure can begin with the support structure being in its transport (or folded) configuration. This configuration permits easy transport of the support structure such as between job sites, installations, and other positions in which the support structure must be carried or transported before being utilized for its intended application, e.g., radar equipment installation. Once onsite or at the relevant location of the application, the operator can change the configuration to the deployed (or unfolded) configuration, in which the leveling devices are located in their outer most radial offset relation. One particular feature of the support structures of the present invention is that the support structure is self-supporting in the deployed configuration. This feature frees the hands of the operator to do other tasks such as doing the gross positioning movements, performing the fine positioning movements, or in the case of the automated support structure the operator can initiate the fine positioning algorithm for implementing the necessary fine positioning movements.

For additional details of these features reference can now be had to the exemplary embodiment of a method 4000 of FIG. 17. There is provided in FIG. 17 that the method 4000 can also comprise at step 4102, placing the support structure in its deployed working configuration, at step 4104, performing a gross positioning movement of the support structure, and at step 4106, performing a fine positioning movement of the support plane. The method 4000 can further comprise at step 4108 initiating self-calibration, and at step 4110 positioning the leveling collar using a manual level indicator. The method 4000 can also comprise at step 4112 starting the fine adjustment algorithm, and at step 4114 installing the load.

Support structures of the type described herein can be configured to perform self-calibration, an example of which causes the actuators in each of the leveling mounts to move to a pre-determined location. This location can be the center of the permissible translation such as the center of the threaded engagement, or in other examples the location can be determined based on the mechanical relationship between selected parts of the support structure. In one example, the location is set during manufacturing of the support structure so that each of the leveling mounts is set to the same point after completion of the self-calibration (e.g., step 4108).

After the device completes its self-calibration the operator can adjust the position of the leveling collars such as by releasing the leveling collar locking mechanism and moving the leveling collar up and down along the leveling mount axis. This adjustment can be done to accommodate for, e.g., high and low spots of the deployment surface. The operator can concurrently view the indicator of the manual level indicator to identify the correct positions for each of the leveling collars. Successive iteration, i.e., moving successive ones of the leveling collars, may be required in order to achieve proper alignment as indicated by the indicator. Likewise it is further contemplated that the position of the leveling collars can be initially positioned based on, or in connection with, certain identifiable deviations in the surface upon which is located the support structure.

Following gross positioning such as gross positioning of the leveling collars, the operator can initiate the fine positioning movement such as by actuating a button or a switch. Some embodiments may also be compatible with other interfaces (e.g., a wireless interface, USB, RS232) so as to receive instructions and information from a peripheral device (e.g., a computer, laptop computer, personal digital assistant ("PDA"), etc.). The interface can initiate a fine positioning algorithm, which in one exemplary implementation can query the dynamic leveling indicator, identify a position of the support plane, determine a required correction of the position, and indicate via a control the required correction to one or more of the actuators of the leveling mounts.

It is contemplated that numerical values, as well as other values that are recited herein are modified by the term "about," whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A support structure, comprising:
   a central support member defining a central support axis, the central support member comprising a pivot end with a first support pad that contacts a deployment surface when deployed and is configured to articulate about a pitch axis, a roll axis, and a yaw axis when in contact with the deployment surface and a support end opposite the pivot end, the support end defining a plane orthogonal to the central support axis;
   a central collar coupled to the central support member, the central collar having a position on the central support axis, the position describing a distance from the pivot end;
   a leveling device coupled to the central collar, the leveling device comprising an actuator for generating motion along a leveling device axis, the motion causing movement of the plane;
   a leveling collar coupled to the actuator and configured to move independent of the actuator;
   a support stay assembly comprising a first elongated member and a second elongated member, each coupled with the leveling collar, wherein the first elongated member couples with the central support member proximate the support end, wherein the second elongated member couples with the central collar, and wherein each of the first elongated member and the second elongated members are configured to move together with the central collar;

a second support pad aligned with the leveling device axis, the second support pad comprising a spherical joint permitting rotation about an articulating axes, a leveling indicator comprising a tilt sensor proximate the support end; and a controller in communication with the tilt sensor, the controller providing a control to the actuator, the control for controlling the motion of the actuator, wherein the leveling device is operative in a first configuration and a second configuration, wherein each of the first configuration and the second configuration describe a radially offset relation of the leveling device relative to the central support axis, and wherein the first configuration changes to the second configuration in response to the position of the central collar.

2. A support structure according to claim 1, wherein the central collar is configured in surrounding relation to the central support member, and wherein the central collar comprises a configuration locking mechanism for causing the collar to compress against the central support member.

3. A support structure according to claim 2, wherein the actuator comprises a pre-determined location identified for self-calibration, and wherein the actuator moves to the pre-determined location in response to the control.

4. A support structure, comprising:

a central support member defining a central support axis, the central support member comprising a pivot end with a first support pad that contacts a deployment surface when deployed and is configured to articulate about a pitch axis, a roll axis, and a yaw axis when in contact with the deployment surface and a support end opposite the pivot end, the support end defining a plane orthogonal to the central support axis;

a central collar coupled to the central support member, the central collar having a position on the central support axis, the position describing a distance from the pivot end, wherein the central collar comprises a collar in surrounding relation to the central support member, wherein the collar comprises a configuration locking mechanism for causing the collar to compress against the central support member;

a leveling device coupled to the central collar, the leveling device comprising an actuator for generating motion along a leveling device axis, the motion causing movement of the plane, wherein the actuator comprises a motor assembly and a lead screw assembly coupled to the motor assembly;

a leveling collar coupled to the actuator and configured to move independent of the actuator;

a support stay assembly comprising a first elongated member and a second elongated member, each coupled with the leveling collar, wherein the first elongated member couples with the central support member proximate the support end, wherein the second support member couples with the central collar, and wherein each of the first elongated member and the second elongated members are configured to move together with the leveling collar; and a second support pad aligned with the leveling device axis, wherein the second support pad comprises a spherical joint permitting rotation about an articulating axes, wherein the leveling device is operative in a first configuration and a second configuration, wherein each of the first configuration and the second configuration describe a radially offset relation of the leveling device relative to the central support axis, and wherein the first configuration changes to the second configuration in response to the position of the central collar.

5. A support structure, comprising:

a central support member defining a central support axis, the central support member comprising a pivot end with a first support pad that contacts a deployment surface when deployed and is configured to articulate about a pitch axis, a roll axis, and a yaw axis when in contact with the deployment surface and a support end opposite the pivot end, the support end defining a plane orthogonal to the central support axis;

a central collar coupled to the central support member, the central collar having a position on the central support axis, the position describing a distance from the pivot end;

a leveling device coupled to the central collar, the leveling device comprising an actuator for generating motion along a leveling device axis, the motion causing movement of the plane, a leveling collar coupled to the actuator and configured to move independent of the actuator;

the second support pad aligned with the leveling device axis, the second support pad comprising a spherical joint permitting rotation about an articulating axes; and a support stay assembly connecting the leveling device and the central support member, the support stay assembly having a plurality of elongated members comprising a first elongated member and a second elongated member, each coupled with the leveling collar, wherein the first elongated member is secured to the central support member proximate the support end and the second elongated member is secured to the central collar, wherein the length of the first elongated member and the second elongated member are the same in the first configuration and the second configuration, and wherein each of the first elongated member and the second elongated members are configured to move together with the leveling collar, and wherein the leveling device is operative in a first configuration and a second configuration, wherein each of the first configuration and the second configuration describe a radially offset relation of the leveling device relative to the central support axis, and wherein the first configuration changes to the second configuration in response to the position of the central collar.

6. A support structure, comprising:

a central support member defining a central support axis, the central support member comprising a pivot end with a support pad that contacts a deployment surface when deployed and is configured to articulate about a pitch axis, a roll axis, and a yaw axis when in contact with the deployment surface and a support end opposite the pivot end, the support end defining a plane orthogonal to the central support axis;

a central collar coupled to the central support member, the central collar having a position on the central support axis, the position describing a distance from the pivot end, wherein the central collar is configured in surrounding relation to the central support member, and wherein the central collar comprises a configuration locking mechanism for causing the collar to compress against the central support member;

a leveling device coupled to the central collar, the leveling device comprising an actuator for generating motion along a leveling device axis, the motion causing movement of the plane, wherein the leveling device is operative in a first configuration and a second configuration, wherein each of the first configuration and the second configuration describe a radially offset relation of the leveling device relative to the central support axis, and wherein the first configuration changes to the second configuration in response to the position of the central collar, wherein the actuator comprises a pre-determined location identified for self-calibration, and wherein the actuator moves to the pre-determined location in response to the control;

a support stay assembly having a plurality of elongated members connecting the leveling device and the central support member; and a leveling collar aligned with an axis of the leveling device, wherein the leveling collar is secured to the elongated members of the support stay assembly, and wherein the leveling collar moves independent of the actuator to cause movement of the plane, wherein the plurality of elongated members comprises a first elongated member and a second elongated member, each coupled with the leveling collar, wherein the first elongated member couples with the central support member proximate the support end, wherein the second elongated member couples with the central collar, and wherein each of the first elongated member and the second elongated member are configured to move together with the leveling collar.

7. A support structure according to claim 6, wherein the leveling collar comprises a coupling joint permitting angular displacement of the first elongated member relative to the central support axis.

8. A support structure according to claim 1, further comprising a manual level indicator coupled to a support plate on the central support member proximate the support end.

9. An automated multi-axis support structure, comprising:
a central support member defining a central support axis, the central support member comprising a pivot end with a support pad that contacts a deployment surface when deployed and is configured to articulate about a pitch axis, a roll axis, and a yaw axis when in contact with the deployment surface and a support end with a support plate orthogonal to the central support axis;

a central collar aligned with the central support axis, the central collar comprising an outer retaining ring and a configuration locking mechanism for changing the inner diameter of the outer retaining ring;

a leveling collar comprising a clamp with an aperture defining a leveling mount axis;

an actuator assembly aligned with the leveling mount axis, the actuator assembly comprising a leveling device with an outer housing exteriorly surrounded by the clamp;

a control system coupled to the actuator assembly, the control system comprising a dynamic leveling indicator proximate the support plate and a controller providing a control to the actuator, the control for controlling the motion of the actuator; and a support stay assembly comprising a first elongated member and a second elongated member, each coupled with the leveling collar, wherein the first elongated member couples with the central support member proximate the support end, wherein the second elongated member couples with the central collar, wherein each of the first elongated member and the second elongated members are configured to move together with the leveling collar, and wherein the leveling collar is configured to move independent of the outer housing.

10. An automated multi-axis support structure according to claim 9, wherein the controller is operatively configured to execute a fine positioning algorithm, wherein the fine positioning algorithm queries the dynamic leveling indicator for information about the orientation of the support plate, and wherein the control causes operation of the actuator to change the orientation of the support plate.

11. An automated multi-axis support structure according to claim 9, further comprising second a support pad and a joint coupling the second support pad to the leveling device, wherein the joint permits relative rotation of the second support pad about one or more axes of an articulating axes of the joint.

12. An automated multi-axis support structure according to claim 11, wherein the joint comprise a ball member and a socket, and wherein the socket is formed as part of the support pad.

13. An automated multi-axis support structure according to claim 11, wherein the outer housing is movable along the leveling device axis.

14. An automated multi-axis support structure according to claim 9, wherein the leveling device is operative in a first configuration and a second configuration, wherein each of the first configuration and the second configuration describe a radially offset relation of the leveling device relative to the central support axis, and wherein the first configuration changes to the second configuration in response to the position of the central collar.

15. A system for leveling a load, comprising:
a central support system comprising a central support member comprising a pivot end with a first support pad that contacts a deployment surface when deployed and is configured to articulate about a pitch axis, a roll axis, and a yaw axis when in contact with the deployment surface, the central support member having a central support axis, a support plane orthogonal to the central support axis, the support plane for receiving the load;

a leveling mount system for adjusting the position of the support plane, the leveling mount system comprising a leveling device with a leveling mount axis and an actuator aligned with the leveling mount axis, the actuator for providing movement of the support plane, the movement comprising a fine positioning movement;

a support stay system comprising a plurality of elongated members coupling the leveling device and the central support member;

a central collar and a leveling collar, one each coupled to, respectively, the central support member and the actuator, wherein the leveling collar is configured to move independent of the actuator;

a second support pad aligned with the leveling device axis, the second support pad comprising a spherical joint permitting rotation about an articulating axes, and a control system providing a control to the actuator, the control system comprising a dynamic leveling indicator providing information about the orientation of the support plane, wherein the control operates the fine positioning movement to adjust the orientation of the support plane in response to the information, wherein the leveling device is operative in a first configuration and a second configuration, wherein each of the first configuration and the second configuration describe a radially offset relation of the leveling device relative to the central support axis, and wherein the first configuration changes to the second configuration in response to the position of the elongated members relative to the central support axis, wherein the actuator assembly comprises a motor and a lead screw assembly coupled to the motor, wherein the control causes the motor to position the lead screw assembly at a pre-determined location, wherein the pre-determined location comprises a zeroing condition for the fine positioning movement, and wherein the plurality of elongated members comprise a first elongated member and a second elongated member, each coupled with the leveling collar, wherein the first elongated member couples with the central support member proximate the support end, wherein the second elongated member couples with the central collar, wherein each of the first elongated member and the second elongated member is configured to move together with the leveling collar, and wherein the leveling collar is configured to move independent of the outer housing.

16. A system according to claim 15, wherein the central collar is configured to change position on the central support member to move the elongated members.

17. A support structure, comprising:
a support plate defining a support plane and a central support axis orthogonal to the support plane;
a central support member coupled with the support plate, the central support member comprising a pivot end with a first support pad that contacts a deployment surface when deployed and is configured to articulate about a pitch axis, a roll axis, and a yaw axis when in contact with the deployment surface;
a plurality of leveling devices coupled to the support plate, each of the leveling device comprising an actuator for generating motion along a leveling device axis causing movement of the support plane;
a second support pad aligned with the leveling device axis, the second support pad comprising a spherical joint permitting rotation about an articulating axes,
a central collar and a leveling collar, one each coupled to, respectively, the central support member and the actuator, wherein the leveling collar is configured to move independent of the actuator;
a support stay assembly comprising a first elongated member and a second elongated member, each coupled with the leveling collar, wherein the first elongated member couples with the central support member proximate the support plate, wherein the second elongated member couples with the central collar, wherein each of the first elongated member and the second elongated members are configured to move together with the leveling collar;
a controller coupled to the actuator, the controller providing a control for controlling the motion of the actuator; and
a leveling indicator comprising a tilt sensor coupled to the controller, the tilt sensor for measuring the orientation of the support plane, wherein the position of the actuator is selected in response to the tilt sensor,
wherein the leveling devices are operative in a first configuration and a second configuration, and
wherein each of the first configuration and the second configuration describe a radially offset relation of the leveling devices relative to the central support axis.

18. A support structure according to claim 17, wherein the first elongated member and the second elongated member rotate amongst a plurality of angular positions relative to the central support axis, and wherein the first configuration and the second configuration correspond to different ones of the angular positions.

* * * * *